(12) United States Patent
Srinivasa et al.

(10) Patent No.: US 8,572,101 B2
(45) Date of Patent: Oct. 29, 2013

(54) FACETED INTERACTION INTERFACE TO OBJECT RELATIONAL DATA

(75) Inventors: Deepak M. Srinivasa, Bangalore (IN); Adarsh Ramamurthy, Kamataka (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/987,589

(22) Filed: Jan. 10, 2011

(65) Prior Publication Data
US 2012/0179697 A1   Jul. 12, 2012

(51) Int. Cl.
*G06F 17/30* (2006.01)
*G06F 7/00* (2006.01)

(52) U.S. Cl.
USPC ........... 707/752; 707/755; 707/756; 707/769; 707/803; 707/960

(58) Field of Classification Search
None
See application file for complete search history.

(56) References Cited

U.S. PATENT DOCUMENTS

| | | | |
|---|---|---|---|
| 6,353,830 B1 | 3/2002 | Yee et al. | |
| 6,976,020 B2 * | 12/2005 | Anthony et al. | 1/1 |
| 7,496,568 B2 * | 2/2009 | Broder et al. | 1/1 |
| 7,536,409 B2 | 5/2009 | Barcia | |
| 7,580,918 B2 * | 8/2009 | Chang et al. | 1/1 |
| 7,624,114 B2 | 11/2009 | Paulus et al. | |
| 7,631,011 B2 | 12/2009 | Kulkarni et al. | |
| 7,765,226 B2 | 7/2010 | Dettinger et al. | |
| 7,899,832 B2 * | 3/2011 | Abhyankar et al. | 707/752 |
| 8,024,324 B2 * | 9/2011 | Amitay et al. | 707/715 |
| 8,280,924 B2 * | 10/2012 | Olenick et al. | 707/807 |
| 2003/0018645 A1 * | 1/2003 | Kong | 707/100 |
| 2005/0102284 A1 | 5/2005 | Srinivasan et al. | |
| 2006/0150169 A1 * | 7/2006 | Cook et al. | 717/156 |
| 2008/0221867 A1 * | 9/2008 | Schreiber | 704/8 |
| 2009/0109225 A1 * | 4/2009 | Srivastava et al. | 345/440 |
| 2010/0063968 A1 | 3/2010 | Sheu et al. | |
| 2010/0114931 A1 * | 5/2010 | Xie et al. | 707/759 |
| 2012/0330636 A1 * | 12/2012 | Albou | 703/12 |

FOREIGN PATENT DOCUMENTS

KR   100564739 B1   3/2006

* cited by examiner

*Primary Examiner* — Kaveh Abrishamkar
*Assistant Examiner* — James J Wilcox
(74) *Attorney, Agent, or Firm* — Charles L. Moore; Moore & Van Allen PLLC

(57) ABSTRACT

A method, system and computer program product to generate selected tabular data from an object relational data model using a faceted interaction interface may include providing a faceted interaction interface to specify a faceted query to provide the selected tabular data from the object relational data model. The faceted query may include at least one facet and at least one facet condition. The method may also include constructing an object relational graph from a plurality of input object tables of the object relational data model. The method may also include selecting each object in the object relational graph which contains at least one facet and identifying each object in the object relational graph on which at least one facet condition applies. The method may additionally include generating at least one object group from the object relational graph. Each object group may include a path from a top level object which contains at least one facet in the object relational graph to an object which contains at least one facet and which does not have any children in the object relational graph. The method may further include generating an object table for each object group, wherein the object table comprises selected tabular data from the object relational data model.

18 Claims, 30 Drawing Sheets

Account Object: 201

| Id | Name | Industry | Address | Phone | Website | Annual Revenue |
|---|---|---|---|---|---|---|
| 1 | GenePoint | Biotechnology | Canada | (650) 867-3450 | www.genepoint.com | 139000000 |
| 2 | United Oil & Gas | Energy | UK | (044) 494-6362 | http://www.uos.com | 350000000 |
| 3 | sForce | Energy | USA | (001) 325-2464 | www.sforce.com | 950000000 |
| 4 | Somers Inc | Electronics | USA | (001) 125-2364 | www.somers.com | 650000000 |
| 5 | PRES | Apparel | USA | (001) 145-2261 | www.pres.com | 500000000 |
| 6 | SilverLining Org | Construction | USA | (001) 041-3123 | www.sl.com | 950000000 |
| 7 | Hursley Ltd | Consulting | UK | (001) 345-3464 | www.hursley.com | 434040000 |
| 8 | Grand Hotels & Resorts Ltd | Hospitality | India | (948) 000-1254 | www.grandhotels.com | 476385000 |
| 9 | Express Logistics and Transport | Transportation | India | (080) 341-2364 | www.expressl&t.net | 473743655 |
| 10 | University of Arizona | Education | Arizona | +44 191 34234 | www.universityofarizona.com | 363636000 |

Contact Object: 203

| Id | FirstName | LastName | Address | Phone | AccountId |
|---|---|---|---|---|---|
| 1 | Adarsh | Ramamurthy | #132, 1st cross Sanjay Nagar | (948) 000-4698 | 8 |
| 2 | James | Smith | #456 2 Place Jussieu | (014) 454-6362 | 8 |
| 3 | Karthik | Ananth | #315, 6th cross Hebbal | (948) 000-3452 | 8 |
| 4 | Rekha | Jain | #23, 3rd cross, 3rd stage, BSK, Bangalore | (948) 000-3423 | 8 |
| 5 | Deepak | Srinivasa | #456, 5th cross Indira Nagar | (948) 081-3473 | 8 |
| 6 | Kiran | Subbaraman | #312, 4th cross Samuel Nagar | (948) 041-3123 | 8 |
| 7 | Julia | Schmidt | School Street | (001) 345-3464 | 14 |
| 8 | Craig | Hayman | Route 114 | (001) 325-2464 | 13 |
| 9 | Marc-Thomas | Schmidt | Route 123 | (001) 125-2364 | 13 |
| 10 | John | McLean | Hursley Park | +44 191 34234 | 16 |
| 11 | Tim | Barr | 134, 4th Street, Brony Town | (001) 125-2364 | 1 |
| 12 | Vikas | Patil | #512, 8th cross Gandhi Nagar | (094) 345-3443 | 4 |
| 13 | Rose | Gonzalez | 313 Constitution Place Austin, TX 78767 USA | (512) 757-9340 | 4 |
| 14 | Sean | Forbes | 312 Constitution Place Austin, TX 78767 USA | (512) 757-4561 | 4 |
| 15 | Jack | Rogers | 525 S. Lexington Ave | (001) 344-3453 | 5 |

FIG. 2B

Opportunity Object: ~220

| Id | Name | Description | Amount | Probability | AccountId |
|---|---|---|---|---|---|
| 1 | Hundred servers – sale for Edge Communications | Edge communications need a hundred servers | 350000.0 | 80 | 4 |
| 2 | Edge SLA | Edge SLA | 60000.0 | 100 | 4 |
| 3 | Grand Hotel Management | Opportunity to take 15% Stake of Leela Palace. | 1500000.0 | 60 | 8 |
| 4 | Grand Hotels SLA | The Grand Hotel Ashoka's partnership | 90000.0 | 100 | 8 |
| 5 | Express Logistics Generators | Express Logistics Portable Truck Generators | 800000.0 | 50 | 9 |
| 6 | Express Logistics SLA | Express Logistics SLA description | 1200000.0 | 70 | 9 |
| 7 | Express Logistics Standby Generator | 100 Standby Generator | 2200000.0 | 100 | 9 |
| 8 | University of AZ Installations | Cheapest Installations | 1000000.0 | 75 | 10 |
| 9 | University of AZ Portable Generators | 34 Portable Generators | 500000.0 | 100 | 10 |
| 10 | University of AZ SLA | AZ SLA | 900000.0 | 100 | 10 |
| 11 | United Oil Generators | 234 Emergency Generators | 4400000.0 | 100 | 11 |
| 12 | United Oil Installations | 34 Oil wells | 2700000.0 | 100 | 11 |
| 13 | United Oil Pumps | 245 perol pumps | 2700000.0 | 90 | 11 |
| 14 | United Oil Office Portable Generators | 190 Portable generators | 125000.0 | 90 | 11 |
| 15 | GenePoint Standby Generator | 36 standby generators | 85000.0 | 100 | 1 |

FIG. 2C

Contract Object: 206 222

| Id | StartDate | EndDate | Status | Address |
|----|-----------|---------|--------|---------|
| 1 | 2009-04-30 | 2009-03-24 | Active | 888 N Euclid Hallis Center, AZ 85721 United States |
| 2 | 2007-02-18 | 2009-03-10 | Active | 1301 Avenue of the Americas New York, NY 10019 USA |
| 3 | 2007-02-18 | 2009-03-10 | Active | Kings Park, Tyne and Wear NE26 3HS United Kingdom |
| 4 | 2007-02-18 | 2009-03-10 | Closed | 9 Tagore Lane Singapore, Singapore 787472 Singapore |
| 5 | 2007-02-18 | 2009-03-10 | Invoiced | 345 Shoreline Park Mountain View, CA 94043 USA |
| 6 | 2007-02-18 | 2009-03-10 | Active | 1302 Avenue of the Americas New York, NY 10019 USA |
| 7 | 2007-02-18 | 2009-03-10 | Active | The Landmark @ One Market |
| 8 | 2007-02-18 | 2009-03-10 | Closed | #34, 1st stage, Tilakawadi, Belgaum |
| 9 | 2007-02-18 | 2009-03-10 | Active | 525 S. Lexington Ave |
| 10 | 2007-02-18 | 2009-03-10 | Invoiced | Raleigh Ave |
| 11 | 2007-02-18 | 2009-03-10 | Active | Hursley Park |
| 12 | 2007-02-18 | 2009-03-10 | Active | Route 100 |
| 13 | 2007-02-18 | 2009-03-10 | Closed | Boeblinger Strasse |
| 14 | 2007-02-18 | 2009-03-10 | Closed | #456, 2nd Cross, 17th Avenue, NY, USA |
| 15 | 2007-02-18 | 2009-03-10 | Closed | Hursley Park |

FIG. 2D

Case Object: 224

| Id | Origin | Reason | Status | Type | ContactId |
|---|---|---|---|---|---|
| 1 | Phone | Equipment Complexity | New | Electrical | 4 |
| 2 | Phone | Performance | Closed | Electrical | 4 |
| 3 | Web | Installation | New | Electrical | 5 |
| 4 | Web | Installation | Closed | Other | 5 |
| 5 | Phone | Other | New | Other | 5 |
| 6 | Phone | Performance | Closed | Electrical | 9 |
| 7 | Phone | Feedback | Closed | Other | 5 |
| 8 | Phone | Breakdown | Closed | Structural | 1 |
| 9 | Web | Feedback | Closed | Other | 2 |
| 10 | Phone | Other | Closed | Mechanical | 10 |
| 11 | Web | Feedback | New | Other | 11 |
| 12 | Web | Equipment Design | Closed | Electronic | 5 |
| 13 | Web | Breakdown | Closed | Electrical | 11 |
| 14 | Web | Equipment Design | Closed | Other | 11 |
| 15 | Phone | Installation | Closed | Other | 1 |

FIG. 2E

OpportunityContactRole: 226

| Id | OpportunityId | ContactId | Role |
|---|---|---|---|
| 1 | 3 | 2 | Business User |
| 2 | 4 | 1 | Business User |
| 3 | 6 | 4 | Executive Sponsor |
| 4 | 8 | 8 | Business User |
| 5 | 4 | 3 | Executive Sponsor |
| 6 | 2 | 9 | Executive Sponsor |
| 7 | 9 | 9 | Business User |
| 8 | 4 | 4 | Business User |
| 9 | 11 | 10 | Influencer |
| 10 | 4 | 5 | Evaluator |
| 11 | 4 | 6 | Business User |
| 12 | 13 | 11 | Influencer |
| 13 | 4 | 2 | Business User |
| 14 | 14 | 11 | Evaluator |
| 15 | 1 | 7 | Influencer |

FIG. 2F

ContactContractRole Object: 230

| Id | ContactId | ContractId | Role | IsPrimary |
|---|---|---|---|---|
| 1 | 2 | 4 | Business User | FALSE |
| 2 | 4 | 1 | Business User | TRUE |
| 3 | 4 | 3 | Executive Sponsor | FALSE |
| 4 | 1 | 11 | Business User | TRUE |
| 5 | 6 | 10 | Executive Sponsor | FALSE |
| 6 | 9 | 2 | Executive Sponsor | TRUE |
| 7 | 9 | 5 | Business User | FALSE |
| 8 | 3 | 7 | Business User | FALSE |
| 9 | 4 | 8 | Influencer | TRUE |
| 10 | 3 | 5 | Evaluator | TRUE |
| 11 | 11 | 6 | Business User | TRUE |
| 12 | 11 | 9 | Influencer | FALSE |
| 13 | 7 | 9 | Business User | TRUE |
| 14 | 11 | 2 | Evaluator | FALSE |
| 15 | 7 | 3 | Influencer | TRUE |

FIG. 2H

OpportunityStage Object: 228

| Id | Default Probability | IsWon | SortOrder | OpportunityId |
|---|---|---|---|---|
| 1 | 25 | TRUE | 1 | 3 |
| 2 | 10 | FALSE | 2 | 4 |
| 3 | 75 | FALSE | 7 | 5 |
| 4 | 50 | FALSE | 4 | 6 |
| 5 | 0 | FALSE | 10 | 7 |
| 6 | 100 | TRUE | 9 | 8 |
| 7 | 60 | FALSE | 5 | 9 |
| 8 | 20 | FALSE | 3 | 10 |
| 9 | 90 | FALSE | 8 | 11 |
| 10 | 70 | FALSE | 6 | 13 |

FIG. 2G

ContractActivity Object: 232

| Id | ContractId | Status | Priority | DurationInHours |
|----|------------|-------------|----------|-----------------|
| 1  | 1          | Resolved    | High     | 3               |
| 2  | 3          | Fixed       | High     | 4               |
| 3  | 4          | New         | Medium   | 6               |
| 4  | 5          | In Progress | Medium   | 3               |
| 5  | 7          | In Progress | High     | 6               |
| 6  | 8          | Resolved    | High     | 2               |
| 7  | 10         | Verified    | Medium   | 7               |
| 8  | 11         | Fixed       | Low      | 1               |
| 9  | 2          | In Progress | High     | 5               |
| 10 | 6          | New         | Low      | 4               |

FIG. 21

Account Object: /—324

| Id | Name | Industry | Address | Phone | Website | Annual Revenue |
|---|---|---|---|---|---|---|
| 8 | Grand Hotels & Resorts Ltd | Hospitality | India | (948) 000-1254 | www.grandhotels.com | 476385000 |

FIG. 3E

Account → Opportunity
Opportunity: 330 /—326

| Id | Name | Description | Amount | Probability | AccountId |
|---|---|---|---|---|---|
| 4 | Grand Hotels SLA | The Grand Hotels IT operations contract for 5 years | 90000.0 | 100 | 8 |
| 3 | Grand Hotel Management | Opportunity to take 15% Stake of Leela Palace. | 150000.0 | 60 | 8 |

332            FIG. 3F            328

Opportunity → OpportunityStage:
OpportunityStage: 340 /—334

| Id | Default Probability | IsWon | SortOrder | OpportunityId |
|---|---|---|---|---|
| 2 | 10 | FALSE | 2 | 4 |
| 1 | 25 | TRUE | 1 | 3 |

338            FIG. 3G            336

Account → Contact
Contact:

| Id | FirstName | LastName | Address | Phone | AccountId |
|----|-----------|----------|---------|-------|-----------|
| 1 | Adarsh | Ramamurthy | #132, 1st cross Sanjay Nagar | (948) 000-4698 | 8 |
| 2 | James | Smith | #456 2 Place Jussieu | (014) 454-6362 | 8 |
| 3 | Karthik | Ananth | #315, 6th cross Hebbal | (948) 000-3452 | 8 |
| 4 | Rekha | Jain | #23, 3rd cross, 3rd stage, BSK, Bangalore | (948) 000-3423 | 8 |
| 5 | Deepak | Srinivasa | #456, 5th cross Indira Nagar | (948) 081-3473 | 8 |
| 6 | Kiran | Subbaraman | #312, 4th cross Samuel Nagar | (948) 041-3123 | 8 |

FIG. 3H

Contact → Case
Case:

| Id | Origin | Reason | Status | Type | ContactId |
|---|---|---|---|---|---|
| 1 | Phone | Equipment Complexity | Closed | Electrical | 4 |
| 2 | Phone | Performance | Closed | Electrical | 4 |
| 3 | Web | Installation | New | Electrical | 5 |
| 4 | Web | Installation | Closed | Other | 5 |
| 5 | Phone | Other | Closed | Other | 5 |
| 7 | Phone | Feedback | Closed | Other | 5 |
| 8 | Phone | Breakdown | Closed | Structural | 1 |
| 9 | Web | Feedback | Closed | Other | 2 |
| 12 | Web | Equipment Design | Closed | Electronic | 5 |
| 15 | Phone | Installation | Closed | Other | 1 |

FIG. 31

Contact → ContactContractRole → Contract
ContactContractRole Object:

| Id | ContactId | ContractId | Role | IsPrimary |
|---|---|---|---|---|
| 1 | 2 | 4 | Business User | FALSE |
| 2 | 4 | 1 | Business User | TRUE |
| 3 | 4 | 3 | Executive Sponsor | FALSE |
| 4 | 1 | 11 | Business User | TRUE |
| 5 | 6 | 10 | Executive Sponsor | FALSE |
| 8 | 3 | 7 | Business User | FALSE |
| 9 | 4 | 8 | Influencer | TRUE |
| 10 | 3 | 5 | Evaluator | TRUE |

FIG. 3J

Contract Object:

| Id | StartDate | EndDate | Status | Address |
|---|---|---|---|---|
| 1 | 2009-04-30 | 2009-03-24 | Active | 888 N Euclid Hallis Center, AZ 85721 United States |
| 3 | 2007-02-18 | 2009-03-10 | Active | Kings Park, Tyne and Wear NE26 3HS United Kingdom |
| 4 | 2007-02-18 | 2009-03-10 | Closed | 9 Tagore Lane Singapore, Singapore 787472 Singapore |
| 5 | 2007-02-18 | 2009-03-10 | Invoiced | 345 Shoreline Park Mountain View, CA 94043 USA |
| 7 | 2007-02-18 | 2009-03-10 | Active | The Landmark @ One Market |
| 8 | 2007-02-18 | 2009-03-10 | Closed | #34, 1st stage, Tilakawadi, Belgaum |
| 10 | 2007-02-18 | 2009-03-10 | Invoiced | Raleigh Ave |
| 11 | 2007-02-18 | 2009-03-10 | Active | Hursley Park |

FIG. 3K

Contract → ContractActivity
ContractActivity: ⟵ 370

| Id | ContractId | Status | Priority | DurationInHours |
|---|---|---|---|---|
| 1 | 1 | Resolved | High | 3 |
| 2 | 3 | Fixed | High | 4 |
| 3 | 4 | New | Medium | 6 |
| 4 | 5 | In Progress | Medium | 3 |
| 5 | 7 | In Progress | High | 6 |
| 6 | 8 | Resolved | High | 2 |
| 7 | 10 | Verified | Medium | 7 |
| 8 | 11 | Fixed | Low | 1 |

Object Group 1:

| Account. Name | Account. Industry | Account. AnnualRevenue | Contact. FirstName | Contact. LastName | Case. Status | Case. Reason |
|---|---|---|---|---|---|---|
| | | | Adarsh | Ramamurthy | Closed | Breakdown |
| | | | | | Closed | Installation |
| | | | James | Smith | Closed | Feedback |
| | | | Karthik | Ananth | | |
| Grand Hotels & Resorts Ltd | Hospitality | 476385000 | Rekha | Jain | Closed | Equipment Complexity |
| | | | | | Closed | Performance |
| | | | | | New | Installation |
| | | | Deepak | Srinivasa | Closed | Installation |
| | | | | | Closed | Other |
| | | | | | Closed | Feedback |
| | | | | | Closed | Equipment Design |
| | | | Kiran | Subbaraman | | |

Object Group 2:

| Account. Name | Account. Industry | Account. AnnualRevenue | Opportunity. Name | Opportunity. Description | Opportunity. Amount | Opportunity Stage.IsWon |
|---|---|---|---|---|---|---|
| Grand Hotels & Resorts Ltd | Hospitality | 476385000 | Grand Hotels SLA | The Grand Hotels IT operations contract for 5 years | 90000.0 | FALSE |
| | | | Grand Hotel Management | Opportunity to take 15% Stake of Leela Palace. | 150000.0 | TRUE |

FIG. 3Q

Object Group 3:

| Contract. StartDate | Contract. EndDate | ContractActivity. Status | ContractActivity. Priority |
|---|---|---|---|
| 2009-04-30 | 2009-03-24 | Resolved | High |
| 2007-02-18 | 2009-03-10 | Fixed | High |
| 2007-02-18 | 2009-03-10 | New | Medium |
| 2007-02-18 | 2009-03-10 | In Progress | Medium |
| 2007-02-18 | 2009-03-10 | In Progress | High |
| 2007-02-18 | 2009-03-10 | Resolved | High |
| 2007-02-18 | 2009-03-10 | Verified | Medium |
| 2007-02-18 | 2009-03-10 | Fixed | Low |

FIG. 3R

Object Group 1 Table: 384

| Account. Name | Account. Industry | Account. AnnualRevenue | Contact. FirstName | Contact. LastName | Case. Status | Case. Reason |
|---|---|---|---|---|---|---|
| Grand Hotels & Resorts Ltd | Hospitality | 476385000 | Adarsh | Ramamurthy | Closed | Breakdown |
| Grand Hotels & Resorts Ltd | Hospitality | 476385000 | Adarsh | Ramamurthy | Closed | Installation |
| Grand Hotels & Resorts Ltd | Hospitality | 476385000 | James | Smith | Closed | Feedback |
| Grand Hotels & Resorts Ltd | Hospitality | 476385000 | Karthik | Ananth | | |
| Grand Hotels & Resorts Ltd | Hospitality | 476385000 | Rekha | Jain | Closed | Equipment Complexity |
| Grand Hotels & Resorts Ltd | Hospitality | 476385000 | Rekha | Jain | Closed | Performance |
| Grand Hotels & Resorts Ltd | Hospitality | 476385000 | Deepak | Srinivasa | New | Installation |
| Grand Hotels & Resorts Ltd | Hospitality | 476385000 | Deepak | Srinivasa | Closed | Installation |
| Grand Hotels & Resorts Ltd | Hospitality | 476385000 | Deepak | Srinivasa | Closed | Other |
| Grand Hotels & Resorts Ltd | Hospitality | 476385000 | Deepak | Srinivasa | Closed | Feedback |
| Grand Hotels & Resorts Ltd | Hospitality | 476385000 | Deepak | Srinivasa | Closed | Equipment Design |
| Grand Hotels & Resorts Ltd | Hospitality | 476385000 | Kiran | Subbaraman | | |

FIG. 3S

Object Group 2 Table: /386

| Account. Name | Account. Industry | Account. AnnualRevenue | Opportunity. Name | Opportunity. Description | Opportunity. Amount | Opportunity Stage.IsWon |
|---|---|---|---|---|---|---|
| Grand Hotels & Resorts Ltd | Hospitality | 476385000 | Grand Hotels SLA | The Grand Hotels IT operations contract for 5 years | 90000.0 | FALSE |
| Grand Hotels & Resorts Ltd | Hospitality | 476385000 | Grand Hotel Management | Opportunity to take 15% Stake of Leela Palace. | 150000.0 | TRUE |

FIG. 3T

Object Group 3 Table: /388

| Contract. StartDate | Contract. EndDate | ContractActivity. Status | ContractActivity. Priority |
|---|---|---|---|
| 2009-04-30 | 2009-03-24 | Resolved | High |
| 2007-02-18 | 2009-03-10 | Fixed | High |
| 2007-02-18 | 2009-03-10 | New | Medium |
| 2007-02-18 | 2009-03-10 | In Progress | Medium |
| 2007-02-18 | 2009-03-10 | In Progress | High |
| 2007-02-18 | 2009-03-10 | Resolved | High |
| 2007-02-18 | 2009-03-10 | Verified | Medium |
| 2007-02-18 | 2009-03-10 | Fixed | Low |

| Contact. FirstName | Case. Status | Account. Industry | Account. Name | Contact. LastName | Account. AnnualRevenue | Case. Reason |
|---|---|---|---|---|---|---|
| Adarsh | Closed | Hospitality | Grand Hotels & Resorts Ltd | Ramamurthy | 476385000 | Breakdown |
| Adarsh | Closed | Hospitality | Grand Hotels & Resorts Ltd | Ramamurthy | 476385000 | Installation |
| James | Closed | Hospitality | Grand Hotels & Resorts Ltd | Smith | 476385000 | Feedback |
| Karthik | | Hospitality | Grand Hotels & Resorts Ltd | Ananth | 476385000 | |
| Rekha | Closed | Hospitality | Grand Hotels & Resorts Ltd | Jain | 476385000 | Equipment Complexity |
| Rekha | Closed | Hospitality | Grand Hotels & Resorts Ltd | Jain | 476385000 | Performance |
| Deepak | New | Hospitality | Grand Hotels & Resorts Ltd | Srinivasa | 476385000 | Installation |
| Deepak | Closed | Hospitality | Grand Hotels & Resorts Ltd | Srinivasa | 476385000 | Installation |
| Deepak | Closed | Hospitality | Grand Hotels & Resorts Ltd | Srinivasa | 476385000 | Other |
| Deepak | Closed | Hospitality | Grand Hotels & Resorts Ltd | Srinivasa | 476385000 | Feedback |
| Deepak | Closed | Hospitality | Grand Hotels & Resorts Ltd | Srinivasa | 476385000 | Equipment Design |
| Kiran | | Hospitality | Grand Hotels & Resorts Ltd | Subbaraman | 476385000 | |

| Opportunity. Amount | Account. Industry | Account. AnnualRevenue | Opportunity. Name | Account. Name | Opportunity. Description | Opportunity Stage.IsWon |
|---|---|---|---|---|---|---|
| 90000.0 | Hospitality | 476385000 | Grand Hotels SLA | Grand Hotels & Resorts Ltd | The Grand Hotels IT operations contract for 5 years | FALSE |
| 150000.0 | Hospitality | 476385000 | Grand Hotel Management | Grand Hotels & Resorts Ltd | Opportunity to take 15% Stake of Leela Palace. | TRUE |

| Account. Name | Account. Industry | Account. AnnualRevenue | Contact. FirstName | Contact. LastName | Case. Status | Case. Reason |
|---|---|---|---|---|---|---|
| Grand Hotels & Resorts Ltd | Hospitality | 476385000 | Adarsh | Ramamurthy | Closed | Breakdown |
| Grand Hotels & Resorts Ltd | Hospitality | 476385000 | Adarsh | Ramamurthy | Closed | Installation |
| Grand Hotels & Resorts Ltd | Hospitality | 476385000 | James | Smith | Closed | Feedback |
| Grand Hotels & Resorts Ltd | Hospitality | 476385000 | Karthik | Ananth | | |
| Grand Hotels & Resorts Ltd | Hospitality | 476385000 | Rekha | Jain | Closed | Equipment Complexity |
| Grand Hotels & Resorts Ltd | Hospitality | 476385000 | Rekha | Jain | Closed | Performance |
| Grand Hotels & Resorts Ltd | Hospitality | 476385000 | Deepak | Srinivasa | New | Installation |
| Grand Hotels & Resorts Ltd | Hospitality | 476385000 | Deepak | Srinivasa | Closed | Installation |
| Grand Hotels & Resorts Ltd | Hospitality | 476385000 | Deepak | Srinivasa | Closed | Other |
| Grand Hotels & Resorts Ltd | Hospitality | 476385000 | Deepak | Srinivasa | Closed | Feedback |
| Grand Hotels & Resorts Ltd | Hospitality | 476385000 | Deepak | Srinivasa | Closed | Equipment Design |
| Grand Hotels & Resorts Ltd | Hospitality | 476385000 | Kiran | Subbaraman | | |

| Account. Name | Account. Industry | Account. AnnualRevenue | Opportunity. Name | Opportunity. Description | Opportunity. Amount | Opportunity Stage.IsWon |
|---|---|---|---|---|---|---|
| Grand Hotels & Resorts Ltd | Hospitality | 476385000 | Grand Hotels SLA | The Grand Hotels IT operations contract for 5 years | 90000.0 | FALSE |
| Grand Hotels & Resorts Ltd | Hospitality | 476385000 | Grand Hotel Management | Opportunity to take 15% Stake of Leela Palace. | 150000.0 | TRUE |

FIG. 5D

| Account. Name | Account. Industry | Account. AnnualRevenue | Contact. FirstName | Contact. LastName | Case. Status | Case. Reason |
|---|---|---|---|---|---|---|
| Grand Hotels & Resorts Ltd | Hospitality | 476385000 | Adarsh | Ramamurthy | Closed | Breakdown |
| | | | | | Closed | Installation |
| | | | James | Smith | Closed | Feedback |
| | | | Karthik | Ananth | | |
| | | | Rekha | Jain | Closed | Equipment Complexity |
| | | | | | Closed | Performance |
| | | | Deepak | Srinivasa | New | Installation |
| | | | | | Closed | Installation |
| | | | | | Closed | Other |
| | | | | | Closed | Feedback |
| | | | | | Closed | Equipment Design |
| | | | Kiran | Subbaraman | | |

FIG. 5E

| Account. Name | Account. Industry | Account. AnnualRevenue | Opportunity. Name | Opportunity. Description | Opportunity. Amount | Opportunity. Stage.IsWon |
|---|---|---|---|---|---|---|
| Grand Hotels & Resorts Ltd | Hospitality | 476385000 | Grand Hotels SLA | The Grand Hotels IT operations contract for 5 years | 90000.0 | FALSE |
| | | | Grand Hotel Management | Opportunity to take 15% Stake of Leela Palace. | 150000.0 | TRUE |

FIG. 5F

FACETED INTERACTION INTERFACE TO OBJECT RELATIONAL DATA

BACKGROUND

Aspects of the present invention relate to object relational data stored on a relational database, and more particularly to a method, system and computer program product to provide a faceted interaction interface to object relational data.

Object relational data models are an extension of relational data models or relational databases which incorporate object oriented constructs. Objects or certain classes or types of data are supported in the data schema and the query language. Certain query facilities may need to be used when working with object relational data models. Such query facilities typically require that the user understands the object relational data model, relationships between objects, and be able to write complicated queries in the query language. Accordingly, a less technical person, or a non-technical person that is not familiar with or does not understand the object relational data model may be unable to interact with the object relational data model and perform tasks, such as querying or updating data.

BRIEF SUMMARY

According to one aspect of the present invention, a method to generate selected tabular data from an object relational data model using a faceted interaction interface may include providing, by a processor, a faceted interaction interface to specify a faceted query to provide the selected tabular data from the object relational data model. The faceted query may include at least one facet and at least one facet condition. The method may also include constructing, by the processor, an object relational graph from a plurality of input object tables of the object relational data model. The method may also include selecting, by the processor, each object in the object relational graph which contains at least one facet and identifying each object in the object relational graph on which at least one facet condition applies. The method may additionally include generating, by the processor, at least one object group from the object relational graph. Each object group may include a path from a top level object which contains at least one facet in the object relational graph to an object which contains at least one facet and which does not have any children in the object relational graph. The method may further include generating, by the processor, an object table for each object group, wherein the object table includes selected tabular data from the object relational data model.

According to another aspect of the present invention, a method to generate object relational data from tabular data may include selecting, by a processor, each object containing data of interest in each input table. The method may also include determining, by the processor, a hierarchy of each selected object relative to other selected objects and reordering, by the processor, each selected object in each input table based on the hierarchy. The method may further include forming, by the processor, a graphical representation comprising each selected object and the data of interest contained in each selected object.

According to another aspect of the present invention, a system to generate selected tabular data from an object relational data model using a faceted interaction interface may include a processor and a module, operating on the processor, to generate selected tabular data from an object relational data model using a faceted interaction interface. The module may include a module to provide a faceted interaction interface to specify a faceted query to provide the selected tabular data from the object relational data model. The faceted query may include at least one facet and at least one facet condition The module may also include a module for constructing an object relational graph from a plurality of input object tables of the object relational data model. The module may include another module for selecting each object in the object relational graph which contains at least one facet and a module for identifying each object in the object relational graph on which at least one facet condition applies. The module may include a further a module for generating at least one object group from the object relational graph. Each object group may include a path from a top level object or node which contains at least one facet in the object relational graph to an object or node which contains at least one facet and which does not have any children in the object relational graph. The module may also include a module for generating an object table for each object group, wherein the object table includes selected tabular data from the object relational data model.

According to a further aspect of the present invention, a computer program product to generate selected tabular data from an object relational data model using a faceted interaction interface may include a computer readable storage medium having computer readable program code embodied therewith. The computer readable program code may include computer readable program code configured to provide a faceted interaction interface to specify a faceted query to provide the selected tabular data from the object relational data model. The faceted query may include at least one facet and at least one facet condition The computer readable program code may include computer readable program code configured to construct an object relational graph from a plurality of input object tables of the object relational data model. The computer readable program code may also include computer readable program code configured to select each object in the object relational graph which contains at least one facet and computer readable program code configured to identify each object in the object relational graph on which at least one facet condition applies. The computer readable program code may additionally include computer readable program code configured to generate at least one object group from the object relational graph. Each object group may include a path from a top level object which contains at least one facet in the object relational graph to an object which contains at least one facet and which does not have any children in the object relational graph. The computer readable program code may further include computer readable program code configured to generate an object table for each object group, wherein the object table comprises selected tabular data from the object relational data model.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIGS. 2A-2I are a plurality of exemplary input object tables for an example of the method of FIG. 1 to generate selected tabular data from an object relational data model in accordance with an embodiment of the present invention.

FIGS. 5A-5I illustrate exemplary operations of the method of FIG. 4 to generate selected object relational data from tabular data in accordance with an embodiment of the present invention.

DETAILED DESCRIPTION

Figure 1:
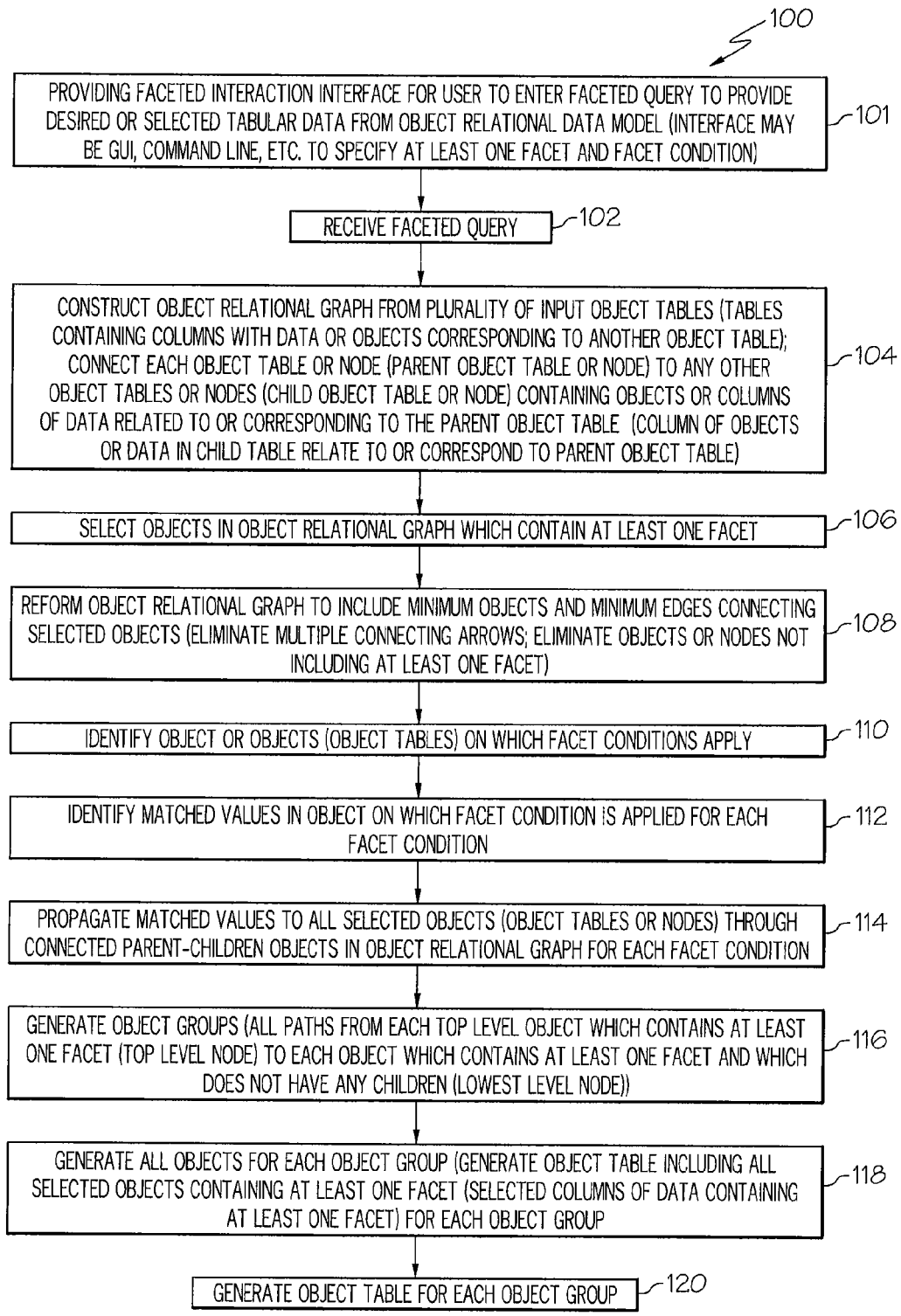
FIG. 1 is a flowchart of an example of a method to generate selected tabular data from an object relational data model using a faceted interaction interface in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of an example of a method 100 to generate selected tabular data from an object relational data model using a faceted interaction interface in accordance with an embodiment of the present invention. In block 101, a faceted interaction interface may be provided to a user to enter a faceted query to provide or retrieve desired or selected tabular data from the object relational model. The faceted interaction interface may be a graphical user interface, command line or other interface for the user to specify a faceted query to retrieve desired or selected data from the object relational model or database. The faceted query may include at least one facet and at least one facet condition that specify what data or information the user is interested in viewing or retrieving. Typically, the faceted query may include a set of facets and at least one facet condition to retrieve the selected tabular data or data of interest from the object relational model. The object relation model may include a plurality of object tables containing object relational data similar to that described herein.

A facet may be a user selected attribute or column of an object table or input object table. Examples of object tables are the plurality of input object tables 200-216 illustrated in FIGS. 2A-2I. The plurality of input object tables 200-216 may define an object relational data model. Examples of facets from object tables 200-216 may include Account.Name 201 in input object table 200, Object.LastName 203 in input table 202 and the like. Accordingly, the facet may be specified by the name or identification of the object table followed by the name or identity of the column in the object table separated by a period. A faceted condition is when a condition is imposed on the facet by the user. For example, the facet may be specified or required to have a specific value or range of values, i.e., Account.Name=Grand Hotels.

Figure 3A:
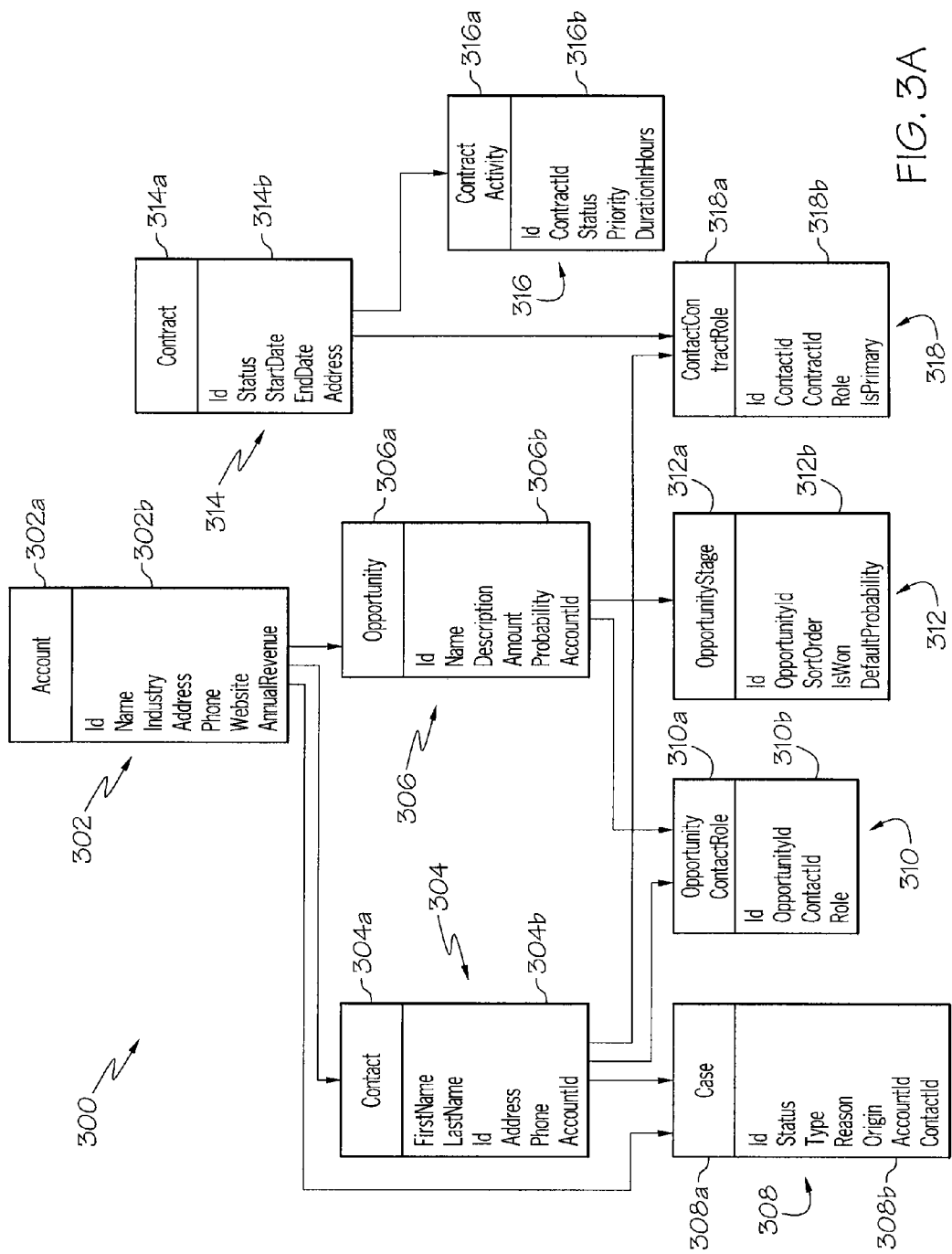
FIGS. 3A-3U illustrate exemplary operations of the method of FIG. 1 to generate selected tabular data from an object relational data model in accordance with an embodiment of the present invention.

The input object tables 200-216 will be used in an example to describe the operations and functions of the method 100 with reference to FIGS. 3A-3U. In the example illustrated in FIGS. 3A-3U the following exemplary faceted query may be entered into a faceted interaction interface similar to that previously described in block 101 of FIG. 1 to generate selected tabular data or data the user that formatted the faceted query is interested in viewing or retrieving from the input object tables 200-216 of object relational data model:

"Account.Name=Grand Hotels & Resorts Ltd/Account.Industry/AccountRevenue/Opportunity.Name/Opportunity.Description/Opportunity.Amount/Contract.FirstName/Contact.LastName/Contract.Phone//Contract.StartDate/Contract.EndDate/ContractActivity.Status/ContractActivity.Priority/Case.Status/Case.Reason/Opportunity Stage.IsWon"

In block 102, the faceted query may be received by the system or processing device on which the method 100 is embodied or operating to retrieve or generate the selected tabular data from the object relational data model.

In block 104, an object relational graph may be constructed from a plurality of input object tables. As previously described, exemplary of input object tables 200-216 are illustrated in FIGS. 2A-2I for use in the example in FIGS. 3A-3U. An example of an object relational graph 300 that may be constructed from the input object tables 200-216 based on the exemplary faceted query specified above is illustrated in FIG. 3A.

Each of the input object tables 200-216 may include a plurality of objects 217-232. Each object 217-232 may define a class, category or type of data. Each object 217-232 may also define a different one of a plurality of columns of data in each object table 200-216. Each cell in each column may include data related to the particular object or an object value related to other data in the row of the input object table 200-216.

In the example illustrated in FIGS. 2A-2I the input object tables include an Account Object table 200, a Contract Object table 202, an Opportunity Object table 204, a Contract Object table 206, a Case Object table 208, an Opportunity Contact Role object table 210, an Opportunity Stage Object table 212, a Contact Contract Role Object table 214, and a Contract Activity Object table 216. The objects 217 for the Account Object table 200 include ID, Name, Industry, Address, Phone, Website and Annual Revenue. Objects 218-232 for the other object tables 202-216 are illustrated in FIGS. 2B-2I.

In block 104 of FIG. 1, constructing the object relational graph 300 in FIG. 3A may include creating a node 302-318 in the object relational graph 300 corresponding to each input object table 200-216. Each node 302-318 may include a header portion 302a-318a that identifies the corresponding input object table 200-216. Each node 302-318 may also include an object listing portion 302b-318b listing each object 217-232 or column of data from the respective input object tables 200-216 corresponding to the respective nodes 302-318.

Each node 302-318 (parent node) corresponding to an object table 200-216 (parent object table) may be connected by an arrow as illustrated in FIG. 3A or other means to any other nodes 302-318 (children nodes) corresponding to object tables 200-216 (children object tables) that contain objects or columns of data related to or corresponding to objects or data in the parent node or object table or that are dependent on data in the parent node or parent object table.

Figure 3B:
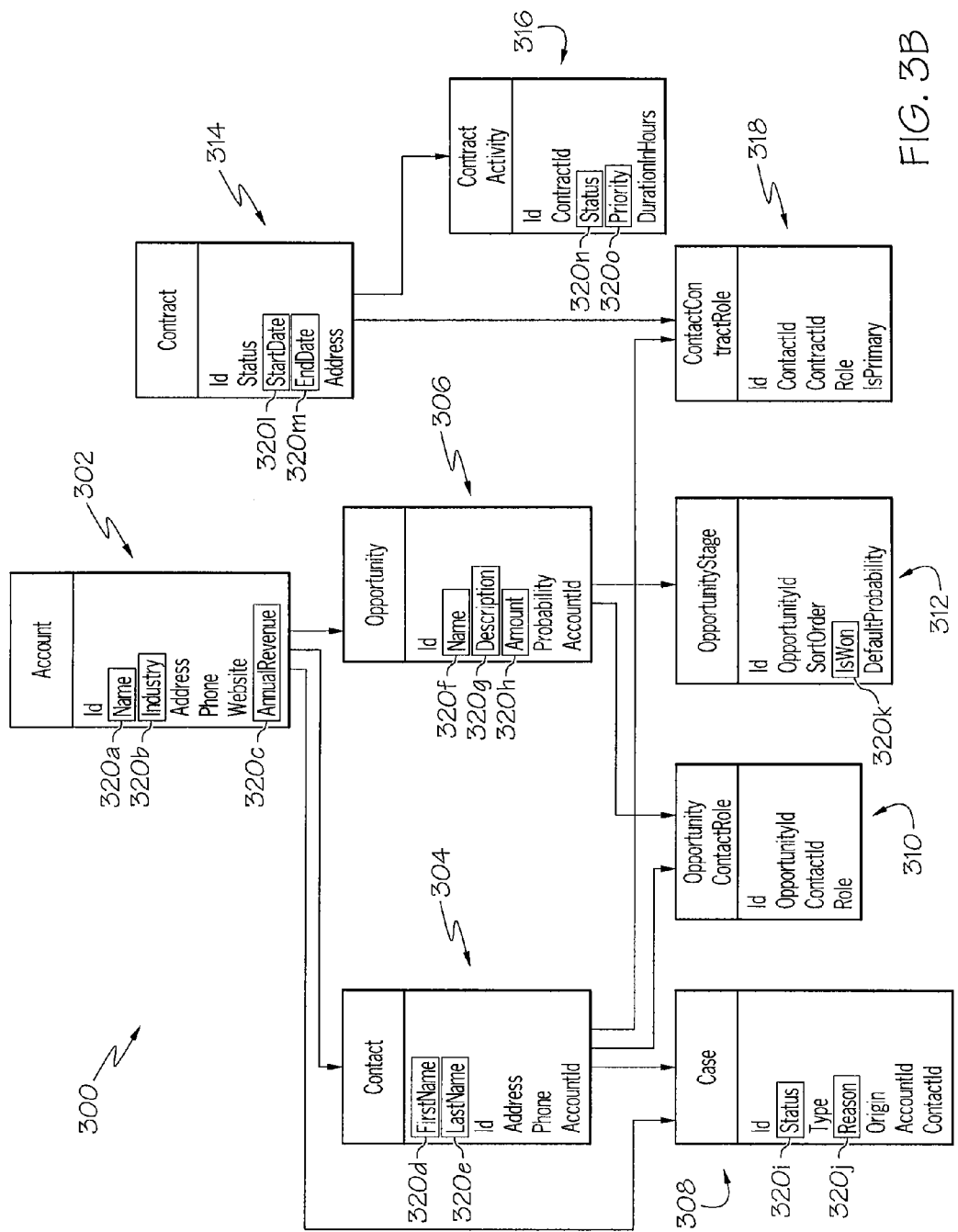

In block 106, objects may be selected in the object relational graph 300 containing at least one facet. The selected objects 320a-320o may be highlighted or otherwise identified in the object relational graph 300. For purposes of illustration, the selected objects 320a-320o are illustrated in FIG. 3B by being enclosed in a box which may represent highlighting or other means for identifying selected objects in the object relational graph 300 that contain at least one facet.

Figure 3C:
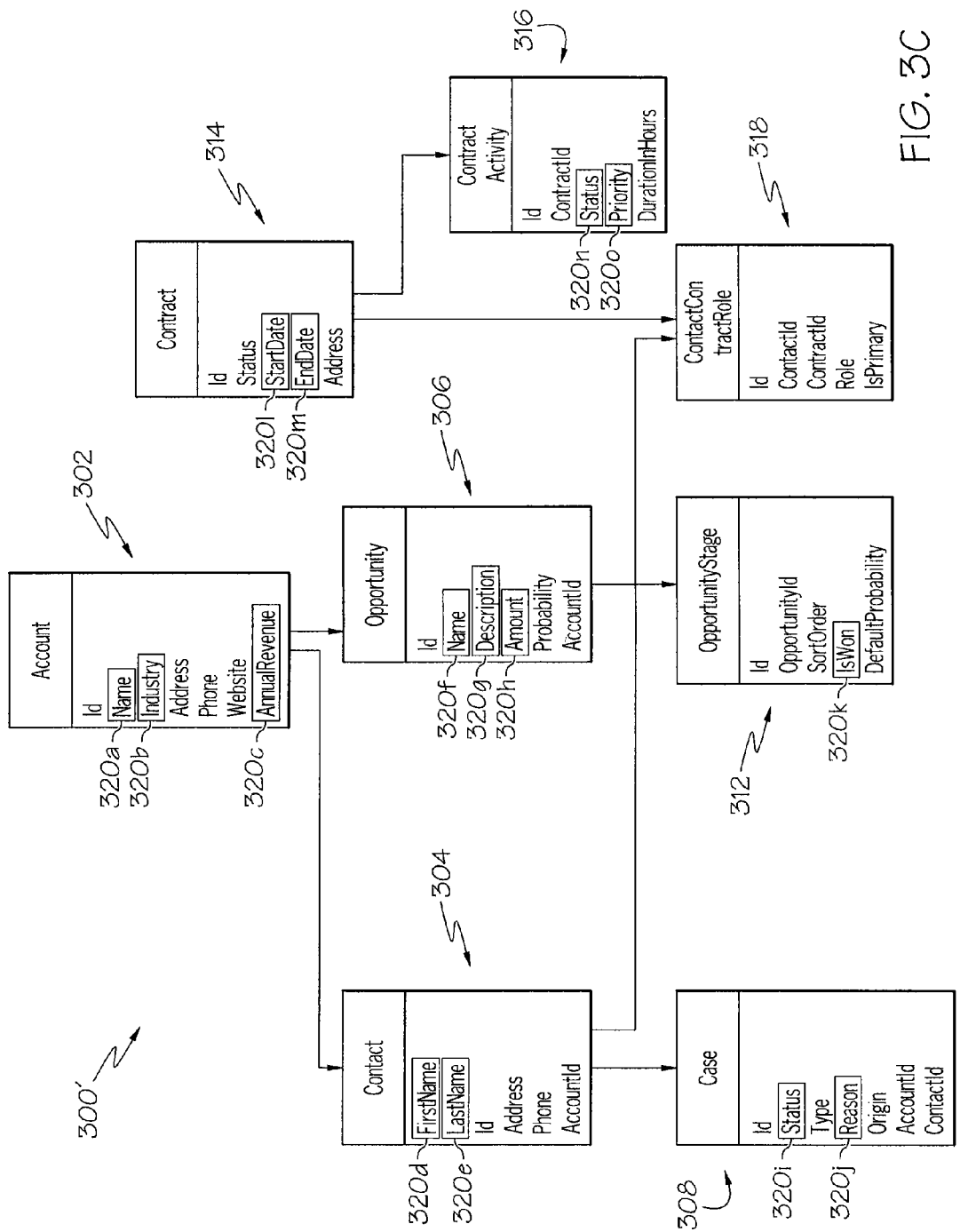

In block 108 of FIG. 1, the object relational graph 300 may be reformed or simplified to include minimum objects and minimum edges connecting the selected objects 320a-320o. Multiple connecting arrows to different nodes 302-320 may be eliminated and object nodes not including at least one facet specified in the faceted query may be eliminated. After the minimum objects or object nodes including at least one facet have been identified, a minimum number of edges or interconnections required to keep the objects connected is identified and the other interconnections may be removed. The minimum number of edges or interconnections may be determined using a technique, such as Steiner tree construction or other combinatorial optimization technique. A reformed or simplified object relational graph 300' is illustrated in FIG. 3C.

In block 110 of FIG. 1, each object (each object table or node) on which a facet condition is applied is identified. In the example illustrated in FIGS. 3A-3U, the facet condition applied is Account.Name=Grand Hotel &Resorts Ltd. The object node containing the object on which the facet is applied may be highlighted or otherwise identified. In the example illustrated in FIG. 3D the object node Account 302 is illustrated as being enclosed in a broken line 322 to represent that the facet is applied to the object Account.Name=Grand Hotel & Resorts Ltd. The broken line 322 represents that the object node Account 302 may be highlighted or otherwise identified to indicate that the facet condition is applied.

In block 112 of FIG. 1, matched values in the object on which the facet condition is applied may be identified for each facet condition. Referring to FIG. 3E, the matched value of the object Account.Name=Grand Hotel & Resorts Ltd. to which the facet condition is applied is Id=8. The Account object 324 of Id=8 in tabular form is illustrated in FIG. 3E which is taken from Account Object table 200 in FIG. 2A.

In block 114 of FIG. 1, the matched values of the object on which the facet condition is applied may be propagated to all selected objects (object tables or nodes in the graphical representation) through connected parent-children objects in the object relational graph 300' (FIG. 3D) for each facet condition. FIG. 3F illustrates the Account-to-Opportunity parent-child object relationship in tabular form 326. The object AccountId=8 enclosed in broken line 328 in the Opportunity object table 330 (corresponding to Opportunity Object table 204 in FIG. 2C) is associated with object OpportunityId values of 4 and 3 as enclosed in broken line 332.

Figure 3D:
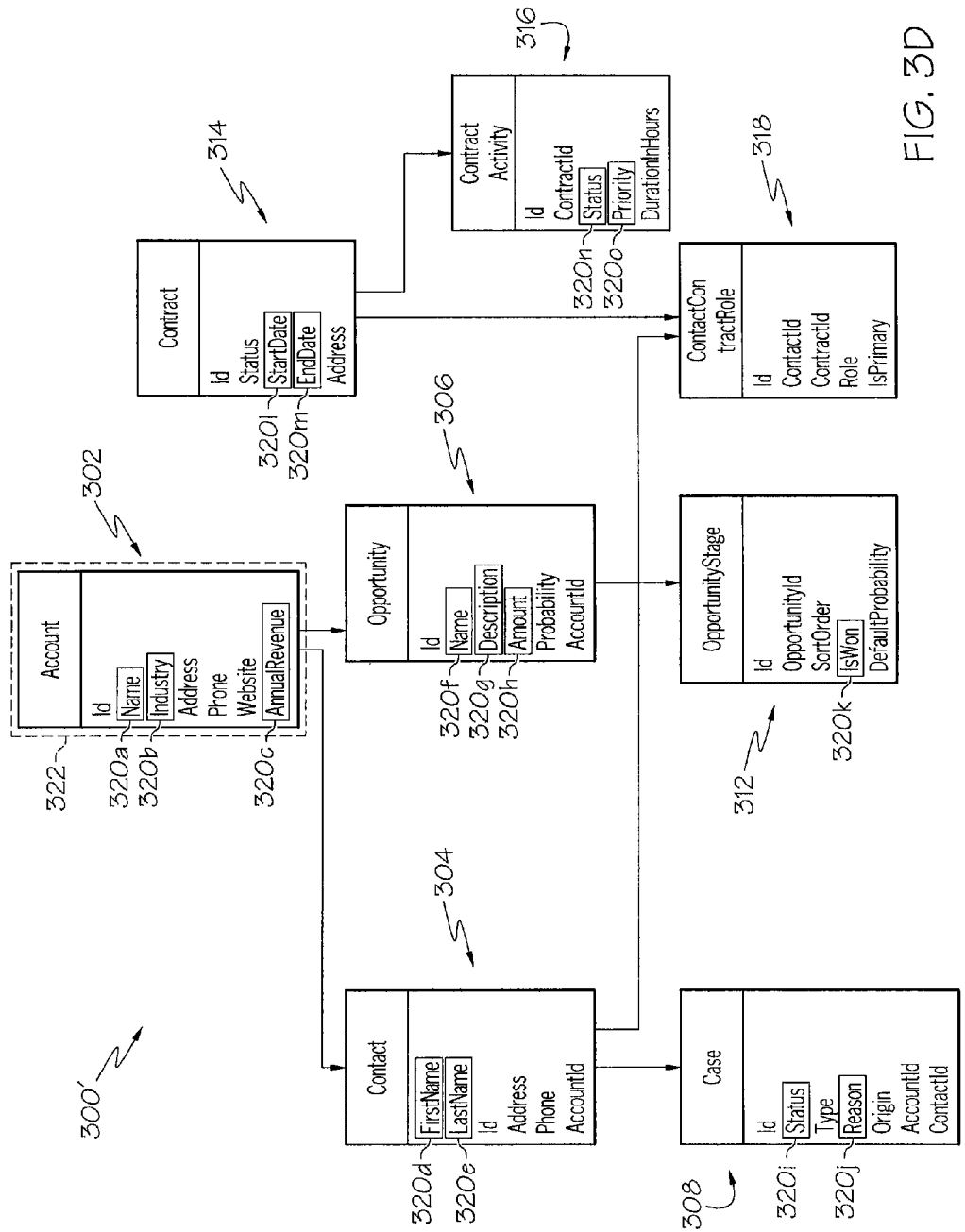

FIG. 3G illustrates in tabular form the Opportunity-to-OpportunityStage parent-child object or node relationship 334 illustrated in the object relational graph 300' in FIG. 3D. For the OpportunityId object values of 4 and 3 enclosed in broken line 336, the OpportunityStage object Id values correspond to 2 and 1 respectively enclosed in broken line 338 in the OpportunityStage object table 340 in FIG. 3G which corresponds to the OpportunityStage object table 212 in FIG. 2G.

FIG. 3H illustrates in tabular form the Account-to-Contact parent-child object or node relationship 342 illustrated in object relational graph 300' in FIG. 3D. For the AccountId object value of 8 enclosed in broken line 344, the Contact object Id values correspond to 1-6, enclosed in broken line 346 as illustrated in Contact object table 348 in FIG. 3H which corresponds to Contact object table 203 in FIG. 2B.

Similarly, FIG. 3I illustrates propagating the matching object values in the Contact-to-Case parent-child object relationship 350 in Case object table 352. The ContactId object values being enclosed in broken line 354 and the corresponding CaseId object values being enclosed in broken line 356 in Case object table 352 which corresponds to Case object table 208 in FIG. 2E.

FIG. 3J illustrates propagating the matching object values in the Contact-to-ContactContractRole-to-Contact parent-child object relationship 358 corresponding to ContactContractRole object table 214 in FIG. 2H. FIG. 3K illustrates in tabular form the Contract Object for ContractId values 1, 3, 4, 5, 7, 8, and 11 enclosed in broken line 360 in the Contract Object table 362 matched in FIG. 3J. The Contract Object table 362 corresponds to the Contract Object table 206 in FIG. 2D. FIG. 3L illustrates propagating the matching object values in the Contract-to-ContractActivity parent-child object relationship 364. ContractId object values are enclosed in broke line 366 which correspond to the ContractActivityId object values enclosed in broken line 368 in the ContactActivity object table 370 which corresponds to the ContractActivity Object table 216 in FIG. 2I.

Figures 3M, 3N, 3O:
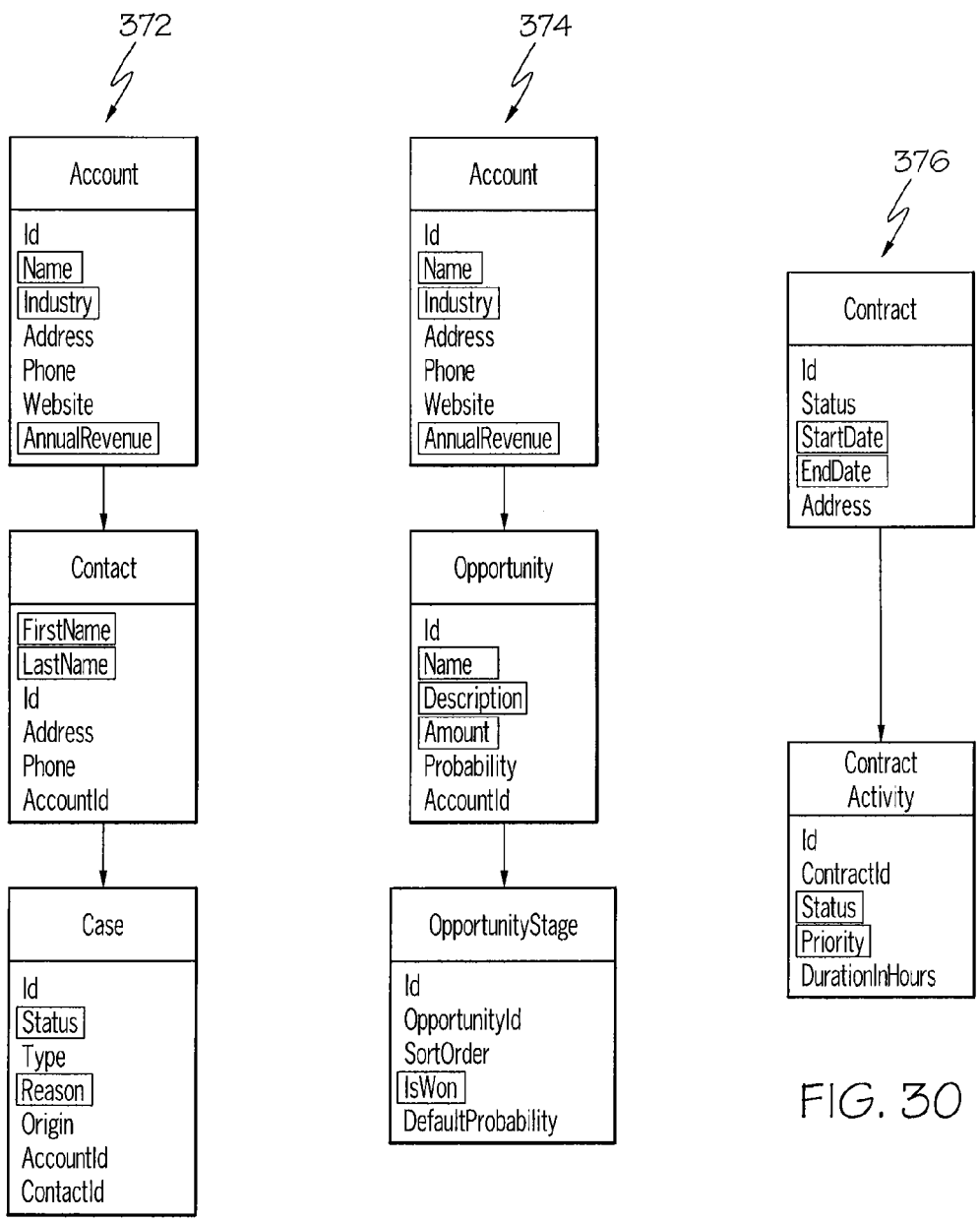

In block 116 of FIG. 1, at least one object group may be generated from the object relational graph for a path from each top level object which contains at least one facet (top level object or node 302 in FIG. 3D) to each object which contains at least one facet and which does not have any children (lowest level object or node). Object groups may be generated for all paths from each top level object or node to each lowest level object or node. Examples of object groups 372, 374 and 376 for the exemplary object relational graph 300' in FIG. 3D are illustrated in FIGS. 3M, 3N and 3O, respectively.

In block 118 of FIG. 1, all objects for each object group may be generated. Examples of generating all objects 378, 380 and 382 for each object group are illustrated in FIGS. 3P, 3Q and 3R, respectively. Common object values for each object are represented in a single row in FIGS. 3P, 3Q and 3R.

In block 120 of FIG. 1, an object table including all selected objects or selected columns of data containing at least one facet may be generated for each object group. Examples of object tables 384, 386 and 388 including all selected objects or selected columns of data containing at least one facet generated for each object group are illustrated in FIGS. 3S, 3T and 3U respectively to provide the selected or desired tabular data from the object relational data model using the faceted interaction interface or facet statement as described above.

Figure 4:
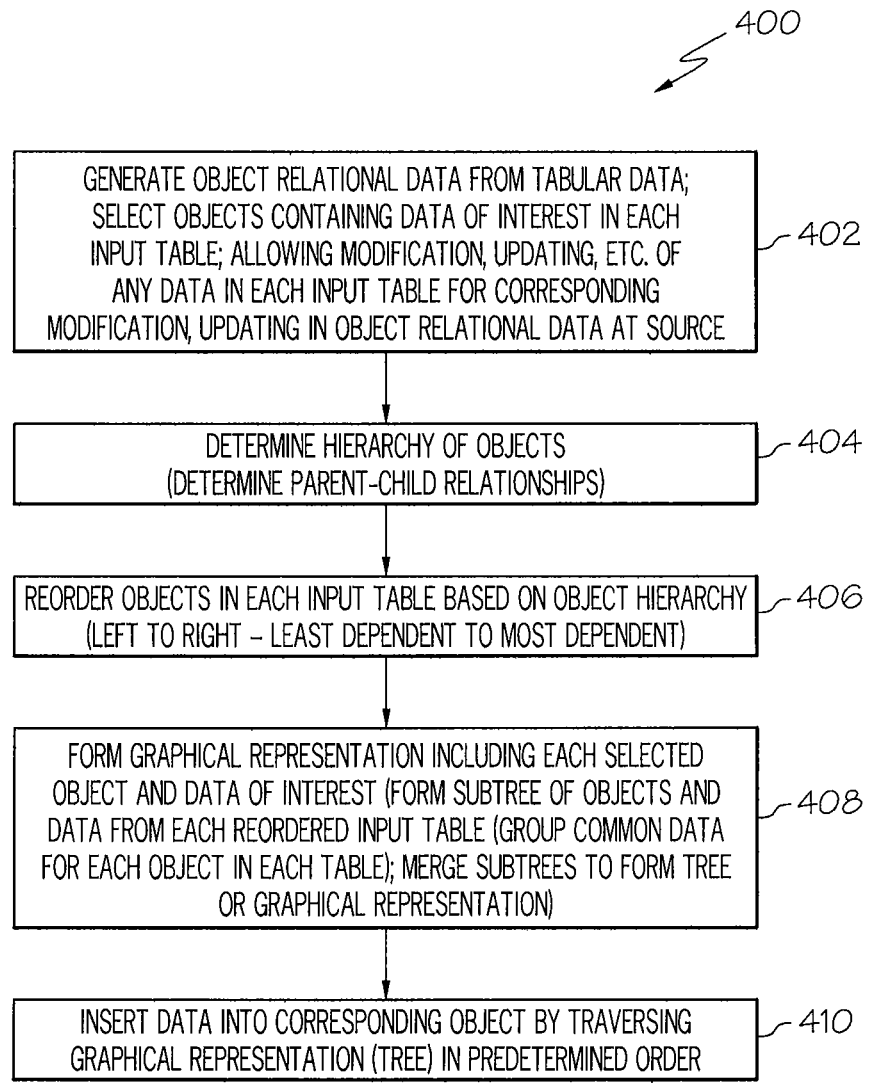
FIG. 4 is a flowchart of an example of a method to generate selected object relational data from tabular data in accordance with an embodiment of the present invention.

FIG. 4 is a flowchart of an example of a method 400 to generate selected object relational data from tabular data in accordance with an embodiment of the present invention. The method 100 of FIG. 1 may be used to retrieve or view selected data of interest. The method 400 may be used to write or modify selected data in the actual object relational data at the source. Accordingly, a user may retrieve data or tabular data of interest using the method 100. Any of the retrieved data may be modified and the method 400 may be used to make corresponding modifications to the actual object relational data at the source or data storage device.

Figure 5G:
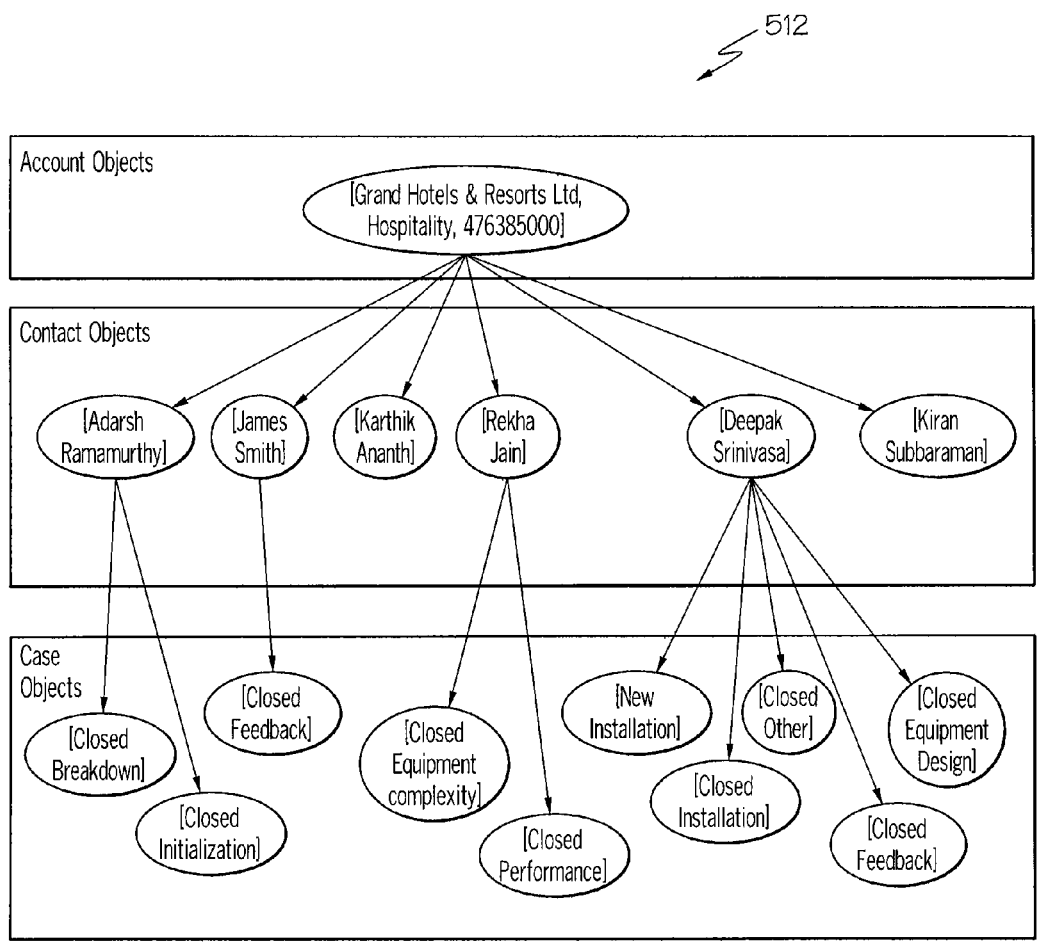

Referring also to FIGS. 5A-5I, FIGS. 5A-5I illustrate an example for explaining the operations and functions of the method 400 of FIG. 4 to generate selected object relational data from tabular data in accordance with an embodiment of the present invention. In block 402, objects containing data of interest or data to provide the selected object relational data may be selected in each input table. FIGS. 5A and 5B are exemplary input tables 500 and 502 for purposes of describing the operations of the method 400. For the example of describing the operations of method 400 the selected objects involved or selected objects of interest in input table 500 include:

Account (Fields: Name, Industry, AnnualRevenue)
Contact (Fields: FirstName, LastName)
Case (Fields: Status, Reason)

The selected objects involved or selected objects of interest in input table 502 include:

Account (Fields: Name, Industry, AnnualRevenue)
Opportunity (Fields: Name, Description, Amount)
OpportunityStage (Fields: IsWon)

Also in block 402, any modifications or updates of any of the data in each input table 500 and 502 may be made for corresponding modification in the object relational data model at the source.

In block 404, a hierarchy of objects may be determined. Determining the hierarchy of objects may include determining parent-child relationships. In the example, the hierarchy for table 500 is Account→Contact→Case. Account object is the parent of Contact object and Contact object is the parent of Case object. The hierarchy for table 502 is Account→Opportunity→OpportunityStage. Account is the parent of Opportunity and Opportunity is the parent of OpportunityStage.

In block 406, the objects in each input table 500 and 502 may be reordered based on the object hierarchy or parent-child relationship. The objects may be arranged left-to-right in order of dependency with the least dependent or parent on the left to the most dependent or children progressing to the right. Reordered tables 504 and 506 are illustrated in FIGS. 5C and 5D respectively. Common object values may be grouped as a single row as illustrated in exemplary tables 508 and 510 in FIGS. 5E and 5F.

Figure 5H:
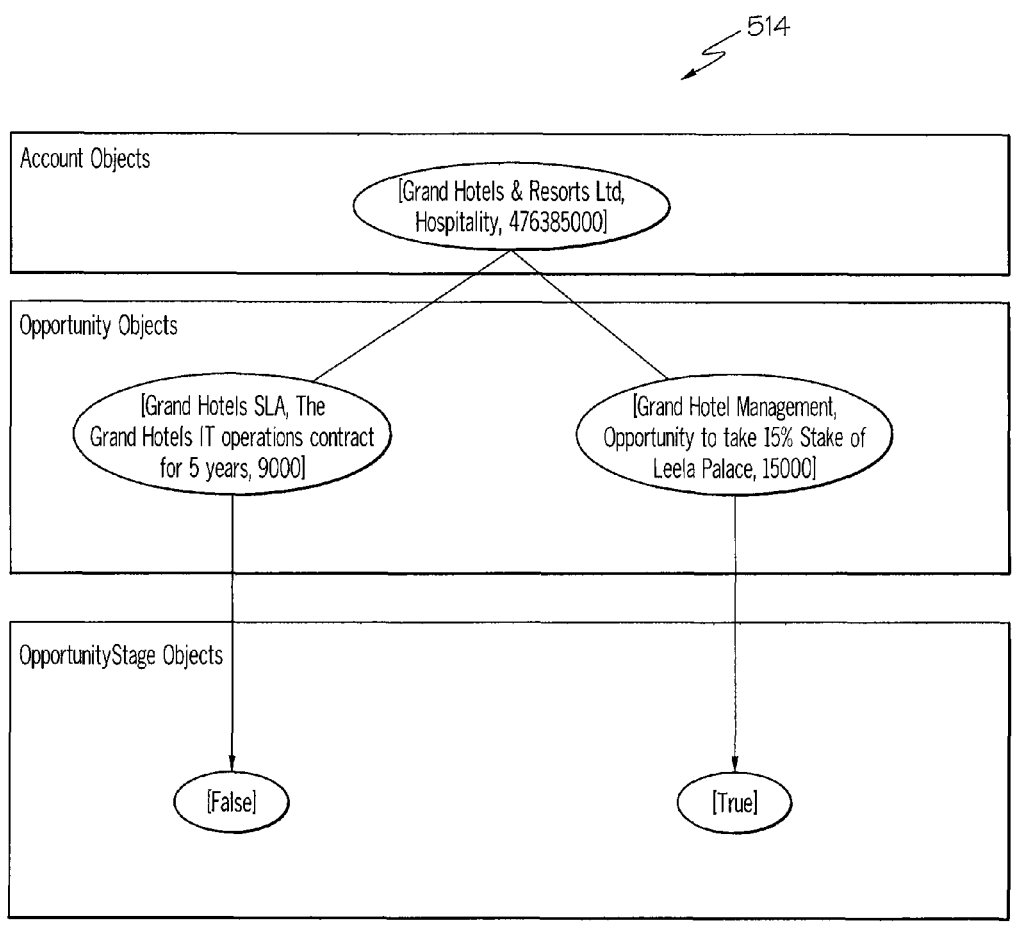
Figure 51:
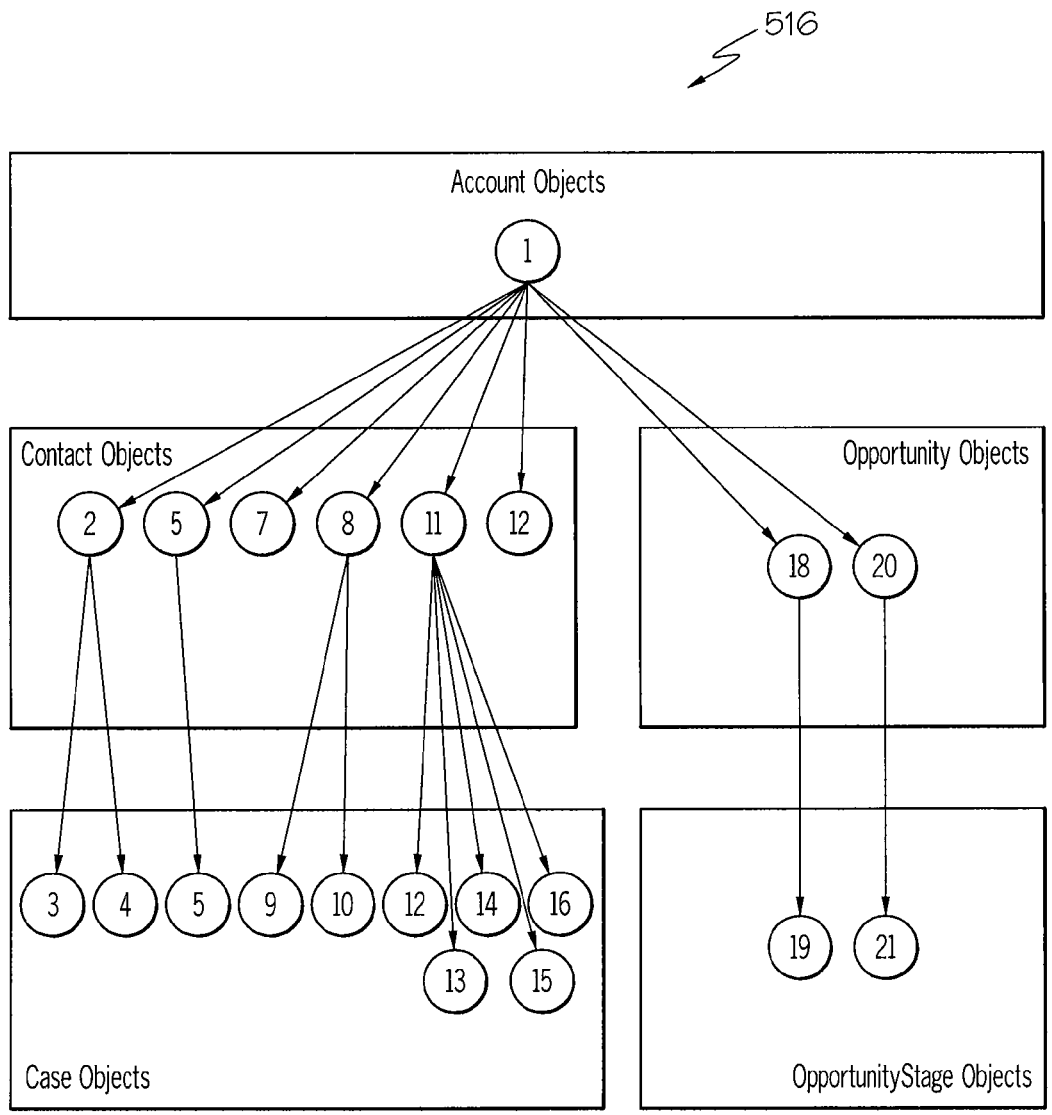

In block 408, a graphical representation including each selected object and data of interest to provide the tabular data may be formed. A subtree of objects and object values or data may be formed from each reordered input table 508 and 510. A subtree 512 formed from reordered input table 508 is illustrated in FIG. 5G and a subtree 514 formed from reordered input table 510 is illustrated in FIG. 5H.

In block 408, the subtrees may be merged or combined to form a single tree or graphical representation of the object relational objects or data. A merged tree 516 merging subtrees 512 and 514 is illustrated in FIG. 5I. In the example, each node of the tree 516 or graphical representation is numbered to correspond to the objects, object values or data that may be inserted in each node.

In block 410, data or object values may be inserted into corresponding objects or nodes by traversing the tree or graphical representation in a predetermined order. An exemplary predetermined order for the example is illustrated in FIG. 5I by the sequence of numbers in the tree 516. In the example, the data or object values for each of the objects or numbered nodes is as follows:
1. Insert [Grand Hotels & Resorts Ltd, Hospitality, 476385000] to Account Object.
2. Insert [Adarsh, Ramamurthy] to Contact Object and associate that contact with [Grand Hotels & Resorts Ltd, Hospitality, 476385000] Account object as parent.
3. Insert [Closed, Breakdown] to Case Object with [Adarsh, Ramamurthy] Contact object as its parent.
4. Insert [Closed, Initialization] to Case Object with [Adarsh, Ramamurthy] Contact object as its parent.
5. Insert [James, Smith] to Contact Object and associate that contact with [Grand Hotels & Resorts Ltd, Hospitality, 476385000] Account object as its parent.
6. Insert [Closed, Feedback] to Case Object with [James, Smith] Contact object as its parent.
7. Insert [Karthik, Ananth] to Contact Object and associate that contact with [Grand Hotels & Resorts Ltd, Hospitality, 476385000] Account object as its parent.
8. Insert [Rekha, Kain] to Contact Object and associate that contact with [Grand Hotels & Resorts Ltd, Hospitality, 476385000] Account object as its parent.
9. Insert [Closed, Equipment complexity] to Case Object with [Rekha, Jain] Contact object as its parent.
10. Insert [Closed, Performance] to Case Object with [Rekha, Jain] Contact object as its parent.
11. Insert [Deepak, Srinivasa] to Contact Object and associate that contact with [Grand Hotels & Resorts Ltd, Hospitality, 476385000] Account object as its parent.
12. Insert [New, Installation] to Case Object with [Deepak, Srinivasa] Contact object as its parent.
13. Insert [Closed, Installation] to Case Object with [Deepak, Srinivasa] Contact object as its parent.
14. Insert [Closed, Other] to Case Object with [Deepak, Srinivasa] Contact object as its parent.
15. Insert [Closed, Feedback] to Case Object with [Deepak, Srinivasa] Contact object as its parent.
16. Insert [Closed, Equipment Design] to Case Object with [Deepak, Srinivasa] Contact object as its parent.
17. Insert [Kiran, Subbaraman] to Contact Object and associate that contact with [Grand Hotels & Resorts Ltd, Hospitality, 476385000] Account object as its parent.
18. Insert [Grand Hotels SLA, The Grand Hotels IT operations contract for 5 years, 9000] to Opportunity Object and associate with [Grand Hotels & Resorts Ltd, Hospitality, 476385000] Account object as its parent.
19. Insert [False] to OpportunityStage object and associate with [Grand Hotels SLA, The Grand Hotels IT operations contract for 5 years, 9000] Opportunity object as its parent.
20. Insert [Grand Hotel Management, Opportunity to take 15% Stake of Leela Palace, 15000] to Opportunity Object and associate with [Grand Hotels & Resorts Ltd, Hospitality, 476385000] Account object as its parent.
21. Insert [True] to OpportunityStage object and associate with [Grand Hotel Management, Opportunity to take 15% Stake of Leela Palace, 15000] to Opportunity object as its parent.

Accordingly, data from the 516 may be inserted into the actual object relational data source in block 410.

Figure 6:
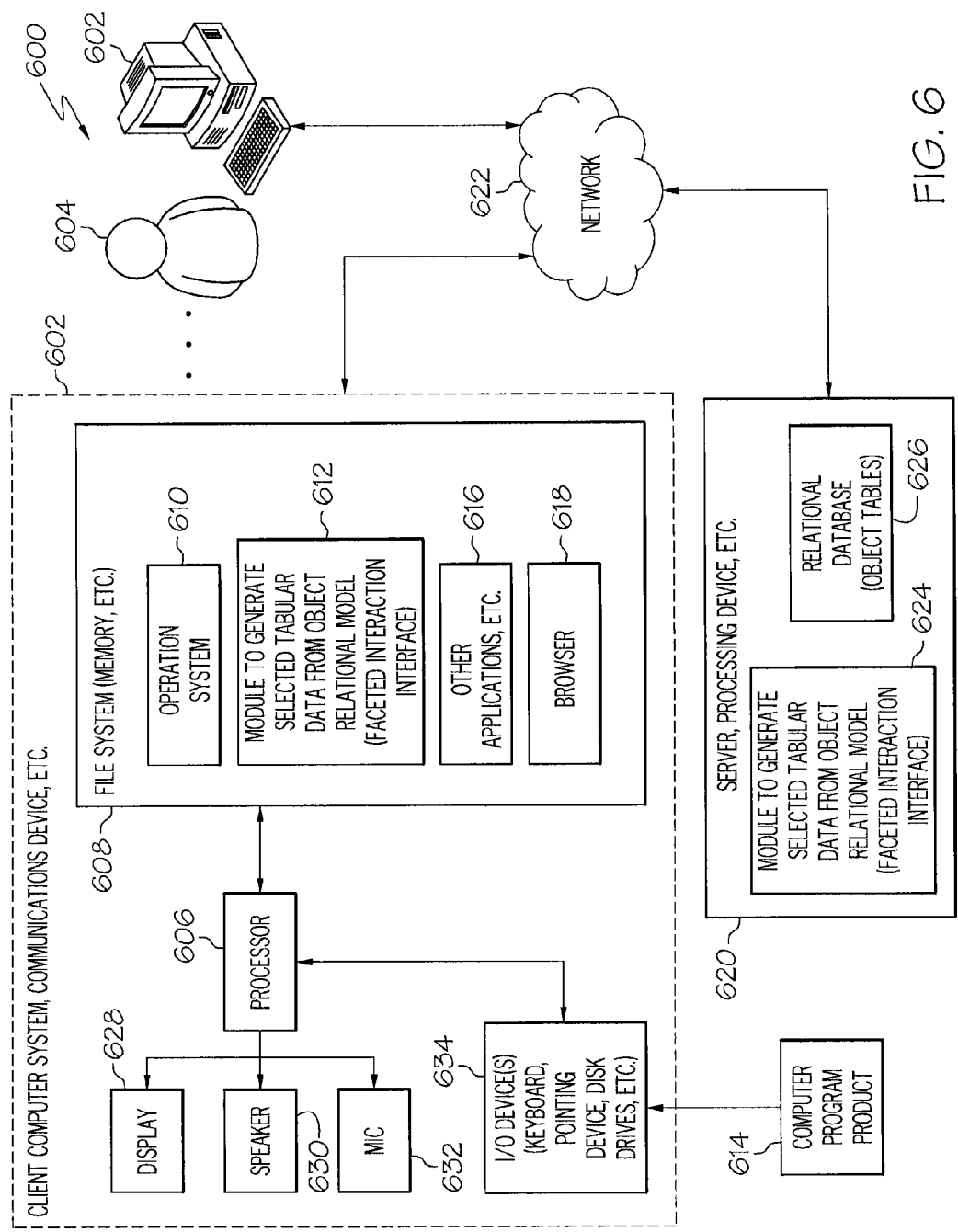
FIG. 6 is a block schematic diagram of an example of a system to provide a faceted interaction interface for object relational data in accordance with an embodiment of the present invention.

FIG. 6 is a block schematic diagram of an example of a system 600 to provide a faceted interaction interface for object relational data in accordance with an embodiment of the present invention. The methods 100 and 400 of FIGS. 1 and 4 may be embodied in or performed by the system 600. The system 600 may include a computer system 602 for use by a user 604 to generate selected tabular data from an object relational model using a faceted interaction interface as described herein with reference to FIG. 1 and FIGS. 3A-3U and to generate object relational data from tabular data similar to that described with reference to FIGS. 4 and 5A-5I. The computer system 602 may be any type of computer device or communications device or the like capable of performing the functions or operations described herein.

The computer system 602 may include a processor 606 to control operation of the computer system 602 and a file system 608, memory or similar data storage device. An operating system 610 may be stored on the file system 608 for running or operating on the processor 606. A module to generate selected tabular data from an object relational model 612 using a faceted interaction interface may be stored on the file system 608 for operation on the processor 606 to perform the functions and operations described herein. The methods 100 and 400 may be embodied in the module 612. The module to generate selected tabular data from an object relational model 612 using a faceted interaction interface may also be stored or embodied on computer readable storage medium or computer program product including a computer readable storage medium similar to that previously described, such as computer program product 614.

Other applications 616, software programs or the like may also be stored on the file system 608 for operation on the processor 606. A web or Internet browser 618 may also be stored on the file system 618 for accessing one or more resources, such as server 620 via a network 622. The network 622 may be the Internet, intranet or other network.

In accordance with an embodiment, the server 620 or processing device may include a module 624 to generate selected tabular data from an object relational model using a faceted interaction interface. The module 624 on the server 620 may be provided in addition to the module 612 on the computer system 602. In another embodiment, only the module 624 on the server 620 may be provided, such as in a cloud computing environment or similar arrangement. The module 624 would then be accessed via the network 622 using the computer system or computing device 602.

A relational database or object relational data model 626 may also reside on the server 620 or may be on another server or network resource. The module to generate selected tabular data from an object relational model 612 or module 624 may then access the object relational model 612 to generate the selected tabular data or obtain the data similar to that described herein.

The computer system 602 may also include a display 628 for presenting the features described herein, such as object tables, object relational graphs and the like. The computer system 602 may also include a speaker system 630 for presenting any audio content that may be part of any presentation. The computer system 602 may additionally include a microphone 632 for the user 604 to aurally communicate via the computer system 602.

The computer system 602 may further include one or more input devices, output devices or combination input/output devices, collectively I/O devices 634. The I/O devices 634 may include a keyboard, pointing device, such as a mouse or other computer pointing device, disk drives and any other devices to permit a user, such as user 604, to interface with and control operation of the computer system 602 and network resources, such as server 620. The module to generate selected tabular data from an object relational data model 612 using a faceted interaction interface may be loaded on the computer system 602 from a computer program product, such as computer program product 614 using one of the input devices 634.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method to generate selected tabular data from an object relational data model using a faceted interaction interface, the method comprising:

providing, by a processor, a faceted interaction interface to specify a faceted query to provide the selected tabular data from the object relational data model, wherein the faceted query comprises at least one facet and at least one facet condition;

constructing, by the processor, an object relational graph from a plurality of input object tables of the object relational data model, wherein constructing the object relational graph comprises creating a node of the object relational graph corresponding to each input object table;

selecting, by the processor, each object in the object relational graph which contains the at least one facet;

identifying, by the processor, each object in the object relational graph on which the at least one facet condition applies;

generating, by the processor, at least one object group from the object relational graph, each object group comprising a path from a top level object which contains the at least one facet in the object relational graph to an object which contains the at least one facet and which does not have any children in the object relational graph;

and generating, by the processor, an object table for each object group, wherein the object table comprises selected tabular data from the object relational data model.

2. The method of claim 1, wherein constructing the object relational graph comprises listing each object or column of data from each input object table in the node corresponding to each input object table.

3. The method of claim 2, wherein constructing the object relational graph comprises connecting each node corresponding to a parent object table to any other nodes corresponding to children object tables containing an object or column of data related to or corresponding to the selected object in the parent object table.

4. The method of claim 1, further comprising reforming the object relational graph to include a minimum number of objects and a minimum number of edges connecting selected objects in response to selecting each object in the object relational graph which contains the at least one facet.

5. The method of claim 1, further comprising identifying a matched value in each object on which the at least one facet condition applies for each facet condition.

6. The method of claim 5, propagating the matched value to all selected objects through connected parent-children objects in the object relational graph to generate the at least one object group.

7. The method of claim 1, wherein generating at least one object group comprises generating the object group for each path from a top level node in the object relational graph to a lowest level node which does not have any children in the object relational graph.

8. A system to generate selected tabular data from an object relational data model using a faceted interaction interface, the system comprising:

a processor;

a module, operating on the processor, to generate selected tabular data from an object relational data model using a faceted interaction interface, the module comprising:

a module to provide a faceted interaction interface to specify a faceted query to provide the selected tabular data from the object relational data model, wherein the faceted query comprises at least one facet and at least one facet condition;

a module for constructing an object relational graph from a plurality of input object tables of the object relational data mode, wherein constructing the object relational graph comprises creating a node of the object relational graph corresponding to each input object table;

a module for selecting each object in the object relational graph which contains the at least one facet; a module for identifying each object in the object relational graph on which the at least one facet condition applies;

a module for generating at least one object group from the object relational graph, each object group comprising a path from a top level object or node which contains the at least one facet in the object relational graph to an object or node which contains the at least one facet and which does not have any children in the object relational graph;

and a module for generating an object table for each object group, wherein the object table comprises selected tabular data from the object relational data model.

9. The system of claim 8, further comprising a module for reforming the object relational graph to include a minimum number of objects and a minimum number of edges connecting selected objects in response to selecting each object in the object relational graph which contains the at least one facet.

10. The system of claim 8, further comprising:
a module for identifying a matched value in each object on which the at least one facet condition applies for each facet condition;
and a module for propagating the matched value to all selected objects through connected parent-children objects in the object relational graph to generate the at least one object group.

11. A computer program product to generate selected tabular data from an object relational data model using a faceted interaction interface, the computer program product comprising:
a non-transitory computer readable storage medium having computer readable program code embodied therewith, the computer readable program code comprising:
computer readable program code configured to provide a faceted interaction interface to specify a faceted query to provide the selected tabular data from the object relational data model, wherein the faceted query comprises at least one facet and at least one facet condition;
computer readable program code configured to construct an object relational graph from a plurality of input object tables of the object relational data model, wherein
constructing the object relational graph comprises creating a node of the object relational graph corresponding to each input object table;
computer readable program code configured to select each object in the object relational graph which contains the at least one facet;
computer readable program code configured to identify each object in the object relational graph on which the at least one facet condition applies;
computer readable program code configured to generate at least one object groups from the object relational graph, each object group comprising a path from a top level object which contains the at least one facet in the object relational graph to an object which contains the at least one facet and which does not have any children in the object relational graph; and
computer readable program code configured to generate an object table for each object group, wherein the object table comprises selected tabular data from the object relational data model.

12. The computer program product of claim 11, wherein the computer readable program code further comprises computer readable program code configured to reform the object relational graph to include a minimum number of objects and a minimum number of edges connecting selected objects in response to selecting each object in the object relational graph which contains the at least one facet.

13. The computer program product of claim 11, wherein the computer readable program code further comprises:
computer readable program code configured to identify a matched value in each object on which the at least one facet condition applies for each facet condition;
and computer readable program code configured to propagate the matched value to all selected objects through connected parent-children objects in the object relational graph to generate the at least one object group.

14. The computer program product of claim 11, wherein the computer readable program code configured to generating at least one object group comprises computer readable program code configured to generate the object group for each path from a top level node in the object relational graph to a lowest level node which does not have any children in the object relational graph.

15. The method of claim 1, wherein each node comprises:
a header portion that identifies the corresponding input object table;
and an object listing portion that lists each column of data in the corresponding input object table.

16. The method of claim 1, further comprising simplifying the object relational graph by at least eliminating each node that does not include at least one facet.

17. The method of claim 1, further comprising simplifying the object relational graph by at least eliminating interconnections between nodes not required to provide a minimum number of interconnections using a combinatorial optimization technique.

18. The method of claim 1, wherein the faceted query comprises an identification of an object table followed by an identification of a column in the object table separated by a period.

* * * * *